Oct. 11, 1966     D. E. A. TANNENBERG     3,277,701
UNIVERSAL MOTIONS SIMULATOR
Filed Nov. 29, 1963     3 Sheets-Sheet 1

Inventor
Dieter E. A. Tannenberg
By: Olson, Trexler, Wolters & Bushnell
Attys.

INVENTOR.
*Dieter E. A. Tannenberg*
BY
*Olson, Trexler, Wolters & Bushnell*
attys Oct. 11, 1966
D. E. A. TANNENBERG
3,277,701
UNIVERSAL MOTIONS SIMULATOR
Filed Nov. 29, 1963
3 Sheets-Sheet 3
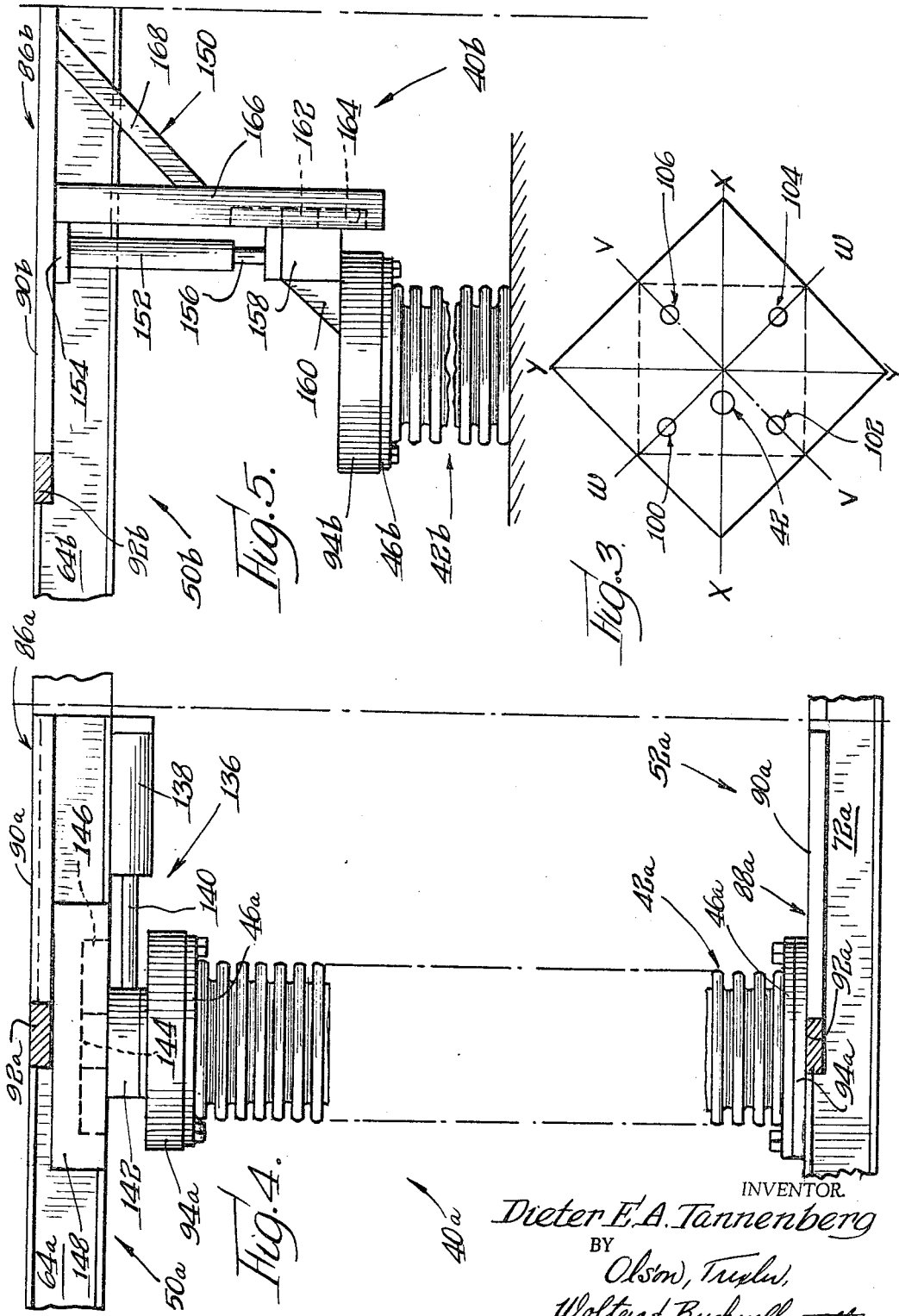
INVENTOR.
Dieter E. A. Tannenberg
BY
Olson, Trexler,
Wolters & Bushnell attys.

United States Patent Office 3,277,701
Patented Oct. 11, 1966

3,277,701
UNIVERSAL MOTIONS SIMULATOR
Dieter E. A. Tannenberg, Palatine, Ill., assignor to Calumet & Hecla, Inc., Chicago, Ill., a corporation of Michigan
Filed Nov. 29, 1963, Ser. No. 326,676
15 Claims. (Cl. 73—100)

This invention relates generally to testing equipment and relates more particularly to apparatus for developing a pattern of motion in a flexible test specimen.

In use, corrugated tubing is called upon to accommodate a variety of different motions arising between the two members that the tubing interconnects. Swiveling motions which alternately compress and expand various radial portions of the corrugated tubing have proved to be particularly destructive. Moreover, the only known way of developing practical information about the resistance of a given component to such motion involves actually subjecting sample components to the particular pattern of motion which will be encountered in the ultimate application. Testing under actual use conditions is time consuming, and the results of such testing are somewhat indeterminate because of the need, under use conditions to expose the component to deteriorating factors other than internal motion. As a consequence, special equipment is sometimes constructed for simulating a particular motion pattern to test the resistance of the given component to that motion. However, this type of single purpose equipment is expensive and only infrequently justified. Hence, much flexible tubing is specified by rule of thumb or educated guesswork.

Accordingly, an important object of the present invention is to provide a general purpose motion tester having a broad range of applicability.

A further object of the invention is to provide testing equipment that is capable of simulating numerous patterns of tilting and swiveling motion.

A more general object of the invention is to provide new and improved testing apparatus.

Yet another object of the invention is to provide testing apparatus that is capable of accurately reproducing the motion patterns which a particular component will encounter in its ultimate use.

Still another object of the invention is to provide motion testing apparatus that combines axially compressive and elongative motion with various types of tilting and swiveling motion.

Another object of the invention is to provide motion testing apparatus that combines laterally oscillative motion with various types of tilting and swiveling motion.

These and other objects and features of the invention will become more apparent from a consideration of the following descriptions.

Apparatus in accord with the invention includes a base frame, a first movable framework mounted for swiveling motion with respect to the base frame, and a second framework fixed in position relative to the base frame and spaced apart from the first framework to accommodate a test specimen therebetween. Mounting arrangements are provided on the two frameworks for use in attachment of the opposite ends of a test specimen. In addition, fluid-actuated jacks are connected to the movable framework and are disposed operatively to engage the base frame at positions spaced from the swivel mounting of the movable framework. A fluid circuit arrangement is provided for operating the jacks in a repeated cycle in order to induce a selected pattern of motion between the mounting arrangements provided respectively on the two frameworks.

The invention, both to its structure and mode of operation, will be better understood by reference to the following disclosure and drawings forming a part thereof, wherein:

FIG. 3 is a diagram relating the fluid actuated jacks to certain reference axes whereby to facilitate description of the motion patterns which may be induced in a test specimen by the apparatus of FIG. 1;

FIG. 4 is an enlarged fragmentary view of a modified form of the apparatus of the invention specifically arranged for combining laterally oscillative motion with various types of tilting and swiveling motion; and FIG. 5 is a view similar to the showing of FIG. 4 but illustrating a further modified embodiment of the invention arranged for combining axially compressive and elongative motion with the various types of tilting and swiveling motion.

Figure 1:
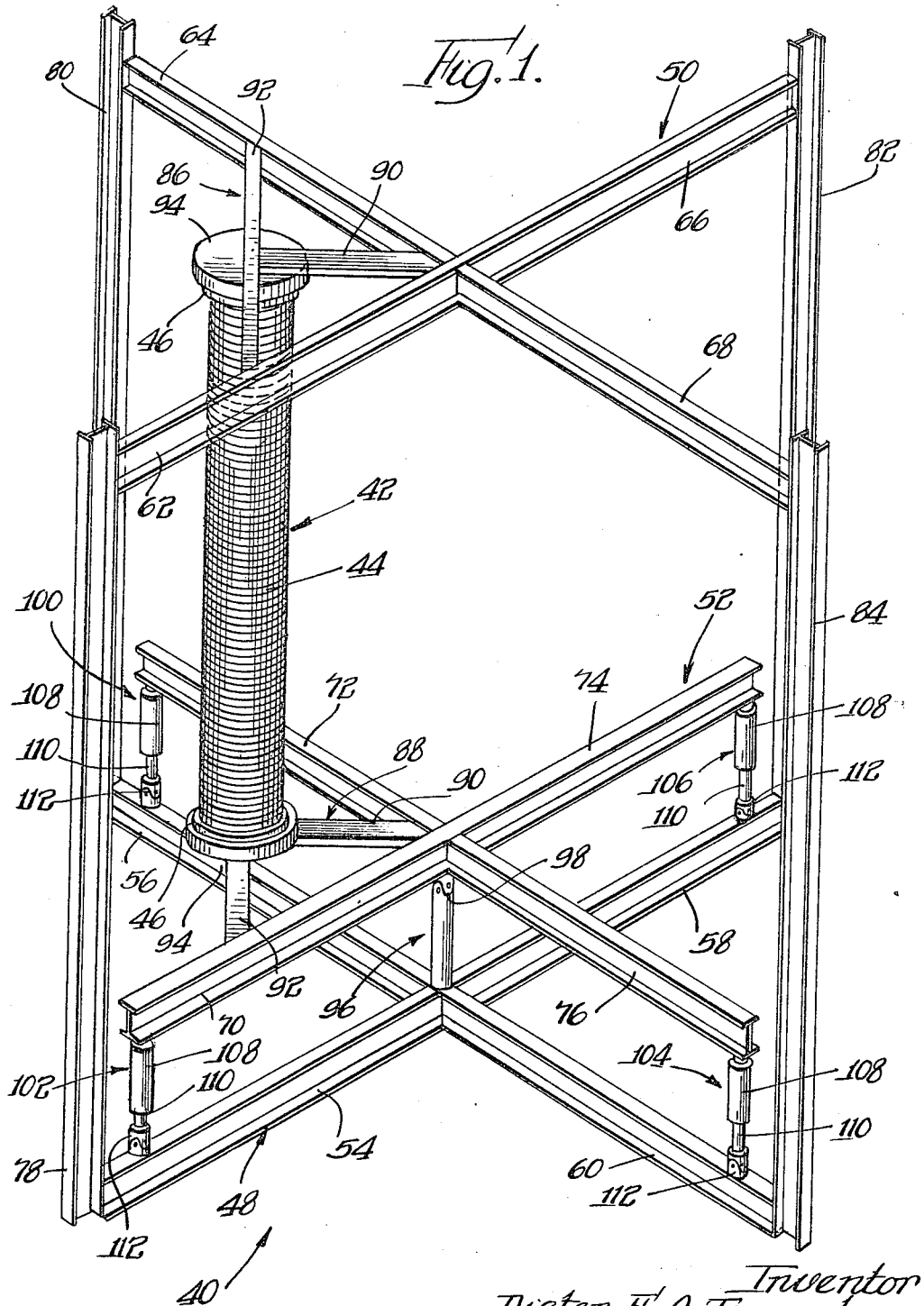
FIG. 1 is a perspective view of testing apparatus constructed in compliance with the principles of the invention.

Referring now in detail to the drawings, specifically to FIG. 1, testing apparatus which is indicated generally by the numeral 40 has mounted therein a test specimen 42. The apparatus 40 is employed in inducing a selected pattern of motion in the test specimen, and the test specimen 42 ordinarily comprises a helically or annularly corrugated tube 44 having end flanges 46 at its opposite ends. While the specimen 42 is illustrated as being made up of a single length of corrugated tubing, it is to be recognized that the apparatus 40 may be employed in inducing a pattern of motion in a test specimen comprising several sections of corrugated tubing having different diameters and being connected by various types of sleeves, collars and analogous fittings. Furthermore, the apparatus 40 may be employed in testing the flexural resistance of flexible specimens other than corrugated tubing, such as for example rubber hose and various types of rubber components.

The apparatus 40 includes a stationary base frame 48, an upper frame or fixed platform 50 and a lower frame or movable platform 52. The movable platform 52 is disposed interjacent the base frame 48 and the fixed platform 50 spaced from the platform 50 in order to accommodate the test specimen 42 between the fixed and the movable platforms. The base frame 48, the upper platform 50 and the intermediate platform 52 are similarly constructed; and in the illustrated embodiment, these members comprise I-beam arms fastened together in the form of a cross and disposed in a common, substantially horizontal plane. The arms of base frame 48 are indicated by the numerals 54, 56, 58 and 60 whereas the arms of the upper platform 50 are indicated by the numerals 62, 64, 66 and 68. Similarly, the arms of the intermediate, movable platform 52 are indicated by the numerals 70, 72, 74 and 76. The base frame 48 is adapted to rest on a floor surface or analogous mounting for support; and while the upper platform 50 may be mounted to roof girders or a specially constructed tower, corner posts of H-beam or I-beam configuration may be secured to both the base frame and to the upper platform 50 for supporting the upper platform and rigidly connecting it to the base frame 48 in alignment therewith. In the illustrated embodiment, corner posts or uprights 78, 80, 82 and 84 are welded or otherwise suitably fastened to the base frame arms 54, 56, 58 and 60 respectively to rise therefrom for similar connection to the ends of the upper platform arms 62, 64, 66 and 68 respectively.

In order to provide attachment sites for the test specimen 42, the upper platform 50 and the intermediate platform 52 are both provided with mounting arrangements which are indicated respectively by the numerals 86 and 88, arrangement 88 being aligned vertically with arrangement 86. These mounting arrangements comprise a T-frame which is disposed to span the space between adjacent arms of the respective platforms. These T-frames are made up of a radial bar 90 and a transverse bar 92; and advantageously, fastening pads or plates 94 are affixed to these T-frames for use in securing the flanges 46 of the test specimen 42 to the corresponding platform. It is to be noted that the plates 94 are situated eccentrically with respect to the corresponding platform.

In compliance with the principles of the invention, a coupling unit 96 is arranged to connect a central portion of the platform 52 to a corresponding portion of the base frame 48, and the coupling unit 96 includes a universal joint 98 so as to permit the platform 52 to swivel freely with respect to the base frame 48. Advantageously, the universal joint 98 is a single universal joint which may consist, in one form, of a cross pivoted at its ends to the forked ends of two shafts. Alternatively, the universal joint 98 may consist of a system of gimbal rings arranged in the conventional manner.

In order to induce motion in the platform 52 and therefore in the mounting arrangement 88, extensible and retractable members are disposed in operative engagement with the base frame 48, these extensible and retractable members being connected to the platform 52 at locations spaced radially apart from the coupling unit 96. In the illustrated embodiment, these extensible and retractable members take the form of fluid actuated jacks 100, 102, 104 and 106. Each of these fluid actuated jacks is of the double acting type and comprises a cylinder 108 which is advantageously affixed to an arm of the platform 52 adjacent the end thereof. Correspondingly, each of the fluid actuated jacks includes an extensible and retractable piston rod 110 which is coupled at its otherwise free end to an underlying arm of the base frame 48. The coupling between the piston rods 110 and the arms of the base frame 48 is arranged to permit the jacks to swivel freely; and therefore, each of these couplings consists of a universal joint 112. All four of the universal joints 112 are disposed in a common horizontal plane. While the fluid actuated jacks 100, 102, 104 and 106 have been described and illustrated as being disposed between the base frame 48 and the movable platform 52, it is to be recognized that these extensible and retractable members may likewise be disposed between the movable platform 52 and the upper platform 50. Similarly, while the upper platform 50 has been shown an described as being fixed in position, it is possible to mount this platform for either independent or coordinated movement relative to the platform 52 by the addition of suitable movement-accommodating joints and power units.

Figure 2:
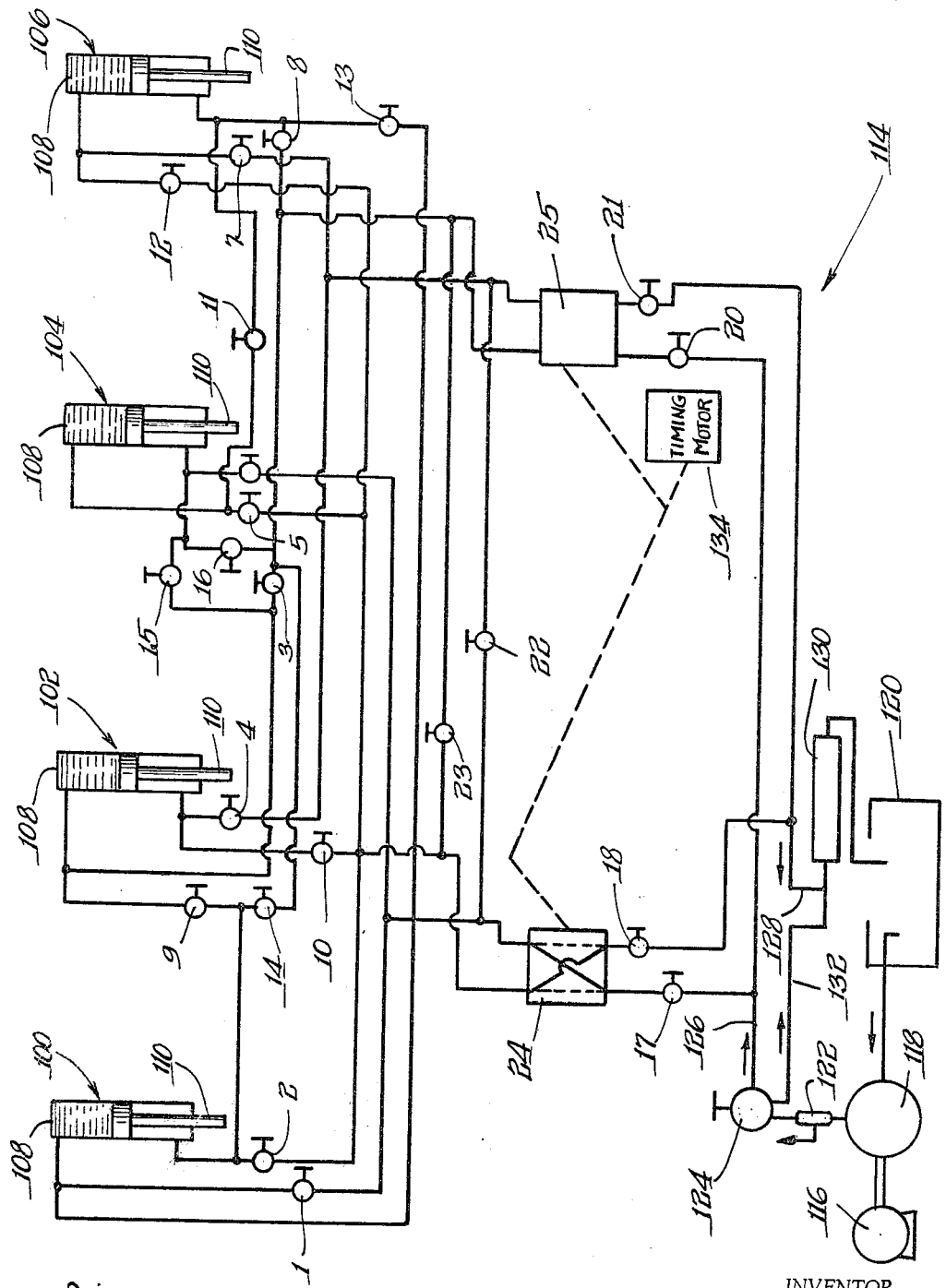
FIG. 2 is a schematic diagram of the fluid circuit arrangement which is employed in controlling the operation of the fluid actuated jacks that are incorporated in the apparatus of FIG. 1.

In further compliance with the principles of the invention, means are provided for individually extending and retracting the piston rods 110 whereby to induce a selected pattern of motion between the mounting arrangements 86 and 88; and turning to a consideration of FIG. 2, a fluid circuit arrangement indicated generally by the numeral 114 is illustrated as the means for controlling the operation of the jacks 100, 102, 104 and 106. The fluid circuit arrangement 114 includes a suitably energized motor 116 which is adapted to drive a pump 118 for withdrawing an actuating fluid such as hydraulic grade oil from a reservoir 120, the pump 118 delivering the actuating fluid through a check valve 122 to a pressure regulator 124. A delivery conduit 126 takes the fluid from pressure regulator 124 for distribution to the remainder of the fluid circuit. A return conduit 128 accepts fluid from the circuit and advantageously conducts it to a heat exchanger 130 from whence it is returned to the reservoir 120. If desired, fluid may be by-passed from the pressure regulator 124 to the heat exchanger 130 through a conduit 132.

The fluid actuated jacks 100, 102, 104 and 106 are disposed circuitwise between the delivery line 126 and the return line 128; and the fluid circuit arrangement 114 specifically includes the conduits which are shown in FIG. 2 as interconnecting the several jacks. As will be apparent from an inspection of FIG. 2, the illustrated conduits connect the several jacks in such a manner that series, parallel, and series-parallel circuits may be completed between the jacks by appropriately closing off certain of the conduits. For purposes of selectively closing off various of the conduits, a number of on-off ball valves, numbered 1–23 inclusively, are located in the fluid circuit at the positions shown in FIG. 2. In addition, the fluid circuit arrangement 114 includes two reversible, 4-way valves indicated by the reference numerals 24 and 25 respectively; and these two multiple-position valves are connected in the fluid circuit as shown in FIG. 2.

Furthermore, means are provided for reversing the internal connections in the valves 24 and 25 in order to cycle the flow of fluid through the particular circuit which has been selected by the appropriate opening and closing of the valves 1–23. For purposes of reversing the valves 24 and 25, the fluid circuit arrangement 114 incorporates a timing motor 134, the output shaft of which is connected to the valves 24 and 25 through appropriate cams, not shown, for the periodic operation of these valves; and it is to be realized that the timing motor 134 may be replaced by an electric timer for selectively energizing solenoids which, in turn, control the operation of the valves 24 and 25. As will be recognized, pulse signals from position responsive switches may be used instead of an electric timer to control solenoid actuation of the valves 24 and 25.

When the fluid circuit arrangement 114 is employed to direct operation of the jacks 100, 102, 104 and 106, numerous patterns of motion can be developed between the mounting arrangements of the platforms 50 and 52; and to facilitate the description of exemplary motion patterns, attention is recommended to FIG. 3 wherein various reference axes are laid out on the configurated jacks 100, 102, 104 and 106. Reference is also had to Table I below which sets forth the configuration of valves 1–22 for several exemplary motion patterns, the letter "o" being employed in Table I to indicate an open condition of a given valve and the letter "c" being employed to indicate a closed condition of the valve.

TABLE I

| Type of Motion | Motion Pattern No. | Condition of Valve | | | | | | | | | | | | | | | | | | | | | | Cycling By Valve |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | |
| X–X Axis | I | o | c | c | c | c | o | c | c | o | o | o | o | c | c | c | c | o | o | c | c | c | c | 24 |
| Y–Y Axis | II | c | o | c | o | o | c | o | c | c | c | c | c | o | o | o | c | c | c | o | o | c | c | 25 |
| V–V Axis | III | c | c | o | o | c | c | o | c | o | c | c | c | c | c | c | c | c | c | c | c | c | c | 25 |
| W–W Axis | IV | o | o | c | c | o | o | c | c | o | c | c | c | c | c | c | c | o | o | c | c | c | c | 24 |
| Vertical Linear Motion | V | o | c | c | c | c | c | o | c | o | o | c | c | c | c | c | o | o | o | o | o | o | o | 24 and 25 |
| Cycle to Corners | VI | o | o | o | o | o | o | o | o | c | c | c | c | c | c | c | o | o | o | o | c | c | c | 24 and 25 |

Further understanding of the invention will be had by considering the W—W axis of FIG. 3. This axis bisects jacks 100 and 104; and rocking of the movable platform 52 along this axis is indicated in Table I as Motion Pattern No. IV. The valves 1–25 are arranged for alternately extending and retracting the piston rods 110 of jacks 100 and 104 in opposite fashion to achieve this type of motion. Valves 20 and 21 being closed for Motive Pattern No. IV, valve 25 is disabled, and cycling is controlled exclusively by valve 24. As valve 24 is cycled by the timing motor 134, the flow connections through the valve alternate between the configuration shown in solid outline and the configuration shown in broken outline in FIG. 2. Thus, while fluid is being urged into the upper part of jack 100, it is being withdrawn at the same time from the lower portion of that jack to be exhausted through valves 24 and 18 into the return line 128. At the same time, fluid is being urged into the lower chamber of jack 104 while fluid is being withdrawn from the upper chamber of that jack, this withdrawn fluid joining the fluid returning from the lower chamber of jack 100. Upon reversing of the configuration of valve 24, the flow of fluid to and from the jacks 100 and 104 is also reversed. Thus, a rocking action is created between jacks 100 and 104, that is, along the W—W axis; and because the test specimen 42 is mounted laterally of the W—W axis, a swiveling motion is induced in the test speciment. The other motion patterns set forth in Table I proceed in like fashion, and it is to be recognized that additional motion patterns are possible by suitably opening and closing the valves 1–22 in different manners.

While a particular embodiment of the invention has been thus far shown and described, it should be understood, of course, that the invention is not strictly limited thereto since many modifications may be made. Therefore and in order to enhance the understanding of the invention, two modified embodiments of the invention are illustrated respectively in FIGS. 4 and 5. Since the embodiments of FIGS. 4 and 5 are similar in certain respects to the embodiment of FIGS. 1–3, like numerals have been used to designate like parts with the suffix letter "a" being employed to distinguish those elements associated with the embodiment of FIG. 4 and with the suffix letter "b" being employed to differentiate those members associated with the modification of FIG. 5.

The embodiment of the testing apparatus 40a which is illustrated in FIG. 4 is particularly characterized by the combination of laterally oscillative motion with the tilting and swiveling motion which is induced in the test specimen by the motion of the movable platform 52a. Specifically, the upper plate or pad 94a is connected to the upper mounting arrangement 86a by means of a horizontal drive 136. The drive 136 includes a fluid actuated jack 138 that is affixed to upper platform 50a and which includes an extensible and retractable piston rod 140. The free end of rod 140 is secured to a slide block 142, and block 142 is fastened to plate 94a, block 142 including a dovetail slide member 144 that is horizontally slidable in a slot 146, slot 146 being fashioned in a bar 148 and bar 148 being secured in a suitable manner to the mounting arrangement 86a. The jack 138 is operated by means of the fluid control arrangement used in directing motion of the movable platform 52a or independently as is desired; and it is to be recognized that the jack 138 and its associated dovetail slide may be replaced by a rack and pinion arrangement driven from a motor.

The modified embodiment of the testing apparatus of the invention which is illustrated in FIG. 5 is characterized by the inclusion of means for combining axially compressive and elongative motion of the test specimen with the various types of tilting and swiveling motion being induced by the movable platform. Specifically, the pad or plate 94b is connected to the remainder of the mounting arrangement 86b by a drive unit 150; and the drive unit 150 includes a fluid actuated jack 152 that is secured to radial bar 90b by a bracket 154. The jack 152 includes an extensible and retractable piston rod 156 that carries a slide block 158 on its free end. The block 158, in turn, is affixed to the plate 94b by welding or other suitable means; and advantageously a gusset plate or web 160 is disposed to act between the plate 94b and the block 158 as a bracing member. The block 158 also carries a dovetail slide member 162 that slides in a vertical groove 164 which is fashioned in an upright bar 166, bar 166 being secured to radial bar 90b and braced with a diagonal strut 168. Like the jack 138, the jack 152 may be operated independently or in coordination with the fluid circuit arrangement that is used in directing and controlling the moveable platform which underlies the platform 50b.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. Apparatus for inducing a pattern of motion in a test specimen, said apparatus comprising: first structure means mounted for swiveling motion and including first mounting means adapted for attachment of one end of a test specimen; second structure means; third structure means for interconnecting said first and second structure means and mounting said second structure means in position spaced apart from said first structure means to accommodate said test specimen therebetween, said second structure means including second mounting means adapted for attachment of the opposite end of said test specimen; extensible and retractable members connected to said first structure means at spaced locations away from the swivel mounting thereof; and means for individually and selectively extending and retracting said members in a repeated cycle, including a timing device, whereby to induce a selected pattern of motion between said first and said second mounting means.

2. Apparatus according to claim 1 wherein one of said mounting means includes a first formation having an attachment site for the test specimen, a second formation rigidly secured to the corresponding structure means and an auxiliary extensible and retractable member connected to said formations for imparting supplementary motion to the corresponding end of the test specimen.

3. Apparatus according to claim 2 wherein said first mentioned extensible and retractable members are disposed parallel and wherein said auxiliary extensible and retractable member is disposed parallel with the first mentioned extensible and retractable members.

4. Apparatus according to claim 2 wherein said first mentioned extensible and retractable members are disposed parallel and wherei nsaid auxiliary extensible and retractable member is disposed generally perpendicular to the first mentioned extensible and retractable members.

5. Apparatus for inducing a pattern of motion in a test specimen, said apparatus comprising: base means; first structure means mounted for swiveling motion with respect to said base means and including first mounting means adapted for attachment of one end of a test specimen; second structure means mounted in fixed position relative to said base means and spaced apart from said first structure means to accommodate said test specimen therebetween, said second structure means including second mounting means adapted for attachment of the opposite end of said test specimen; extensible and retractable members operatively engaging one of said second structure means and said base means and connected to said first structure means at spaced locations away from the swivel mounting thereof; and means for individually and selectively extending and retracting said members in a repeated cycle, including a timing device, whereby to induce a selected pattern of motion between said first and said second mounting means.

6. Apparatus for inducing a pattern of motion in a test specimen, said apparatus comprising: a stationary base frame; a movable platform aligned with said base frame and including first mounting means adapted for attachment of one end of a test specimen; coupling means connecting a portion of said movable platform to said base frame and including a universal joint whereby to permit said movable platform to swivel freely; a second platform aligned with said base frame and spaced from said movable platform to accommodate said test specimen therebetween, said second platform including second mounting means adapted for attachment of the opposite end of said test specimen; a plurality of fluid actuated jacks operatively connected to said movable platform at spaced locations; a coupling for individually mounting each of said jacks to one of said second platform and said base frame and including a universal joint whereby to permit said jacks to swivel freely; and fluid circuit means connected to said jacks for controlling the operation thereof so as to induce a selected pattern of motion between said first and said second mounting means.

7. Apparatus for inducing a pattern of motion in a test specimen, said apparatus comprising: a stationary base frame; a movable platform aligned with said base frame and including eccentrically disposed first mounting means adapted for attachment of one end of a test specimen; coupling means connecting a central portion of said movable platform to said base frame and including a universal joint whereby to permit said movable platform to swivel freely; a second platform aligned with said base frame and spaced from said movable platform to accommodate said test specimen therebetween, said second platform including second mounting means adapted for attachment of the opposite end of said test specimen; a plurality of fluid actuated jacks operably connected to said movable platform at spaced locations around said coupling means; a coupling for individually mounting each of said jacks to one of said second platform and said base means and including a universal joint whereby to permit said jacks to swivel freely; and fluid circuit means connected to said jacks for controlling the operation thereof so as to induce a selected pattern of motion between said first and said second mounting means.

8. Apparatus for inducing a pattern of motion in a test specimen, said apparatus comprising: a stationary base frame; a movable platform aligned with said base frame and including eccentrically disposed first mounting means adapted for attachment of one end of a test specimen; coupling means connecting a central portion of said movable platform to said base frame and including a universal joint whereby to permit said movable platform to swivel freely; a second platform aligned with said base frame and spaced from said movable platform to accommodate said test specimen therebetween, said second platform including eccentrically disposed second mounting means aligned with said first mounting means and adapted for attachment of the opposite end of said test specimen; a plurality of fluid actuated jacks operatively connected to said movable platform at spaced locations around said coupling means; a coupling for individually mounting each of said jacks to one of said second platform and said base frame and including a universal joint whereby to permit said jacks to swivel freely; and fluid circuit means connected to said jacks for controlling the operation thereof so as to induce a selected pattern of motion between said first and said second mounting means.

9. Apparatus for inducing a pattern of motion in a test specimen, said apparatus comprising: a stationary base frame; a movable platform aligned with said base frame and including first mounting means adapted for attachment of one end of a test specimen; coupling means connecting a portion of said movable platform to said base frame and including a universal joint whereby to permit said movable platform to swivel freely; a second platform aligned with said base frame and spaced from said movable platform to accommodate said test specimen therebetween, said second platform including second mounting means adapted for attachment of the opposite end of said test specimen; structure means rigidly interconnecting said base frame and said second platform whereby to fix said second platform in position relative to said base frame; a plurality of fluid actuated jacks operatively connected to said movable platform at spaced locations; a coupling for individually mounting each of said jacks to one of said second platform and said base frame and including a universal joint whereby to permit said jacks to swivel freely; and fluid circuit means connected to said jacks for controlling the operation thereof so as to induce a selected pattern of motion between said first and said second mounting means.

10. Apparatus for inducing a pattern of motion in a test specimen, said apparatus comprising: a stationary base frame; a movable platform aligned with said base frame and including first mounting means adapted for attachment of one end of a test specimen; coupling means connecting a portion of said movable platform to said base frame and including a universal joint whereby to permit said movable platform to swivel freely; a second platform aligned with said base frame and spaced from said movable platform to accommodate said test specimen therebetween, said second platform including second mounting means adapted for attachment of the opposite end of said test specimen; a plurality of double acting, fluid actuated jacks operatively connected to said movable platform at spaced locations; a coupling for individually mounting each of said jacks to one of said second platform and said base frame and including a universal joint whereby to permit said jacks to swivel freely; and fluid circuit means connected to said jacks for controlling the operation thereof, including conduit means connecting said jacks in series, parallel and series-parallel circuits and valve means operable to select a given circuit connection of said jacks and to cycle the flow of fluid through the selected circuit so as to induce a selected pattern of motion between said first and said second mounting means.

11. Apparatus for inducing a pattern of motion in a test specimen, said apparatus comprising: a stationary base frame; a movable platform aligned with said base frame and including first mounting means adapted for attachment of one end of a test specimen; coupling means connecting a portion of said movable platform to said base frame and including a universal joint whereby to permit said movable platform to swivel freely; a second platform aligned with said base frame and spaced from said movable platform to accommodate said test specimen therebetween, said second platform including second mounting means adapted for attachment of the opposite end of said test specimen; a plurality of double acting, fluid actuated jacks operatively connected to said movable platform at spaced locations; a coupling for individually mounting each of said jacks to one of said second platform and said base frame and including a universal joint whereby to permit said jacks to swivel freely; and fluid circuit means connected to said jacks for controlling the operation thereof, including conduit means connecting said jacks in series, parallel and series-parallel circuits, a plurality of two-position valves operable to select a given circuit connection of said jacks and at least one reversible, multiple-position valve operable to cycle the flow of fluid through the selected circuit, so as to induce a selected pattern of motion between said first and said second mounting means.

12. Apparatus according to claim 6 wherein the universal joints of said couplings are disposed in a common plane.

13. Apparatus according to claim 6 wherein one of said mounting means includes a first formation having an attachment site for the test specimen, a second formation rigid with the corresponding platform and an auxiliary extensible and retractable member connected to said formations for imparting supplementary motion to the corresponding end of the test specimen.

14. Apparatus for inducing a pattern of motion in a test specimen, said apparatus comprising: a stationary base frame; a movable platform aligned with said base frame and including eccentrically disposed first mounting means adapted for attachment of one end of a test specimen; coupling means connecting a central portion of said movable platform to said base frame and including a universay joint whereby to permit said movable platform to swivel freely; a second platform aligned with said base frame and spaced from said movable platform to accommodate said test specimen therebetween, said second platform including second mounting means adapted for attachment of the opposite end of said test specimen; a plurality of double acting, fluid actuated jacks operatively connected to said movable platform at spaced locations around said coupling means; a coupling for individually mounting each of said jacks to one of said second platform and said base means and including a universal joint whereby to permit said jacks to swivel freely; and fluid circuit means connected to said jacks for controlling the operation thereof, including conduit means connecting said jacks in series, parallel and series-parallel circuits and valve means operable to select a given circuit connection of said jacks and to cycle the flow of fluid through the selected circuit so as to induce a selected pattern of motion between said first and said second mounting means.

15. Apparatus for inducing a pattern of motion in a test specimen, said apparatus comprising: a stationary base frame; a movable platform aligned with said base frame and including eccentrically disposed first mounting means adapted for attachment of one end of a test specimen; coupling means connecting a central portion of said movable platform to said base frame and including a universal joint whereby to permit said movable platform to swivel freely; a second platform aligned with said base frame and spaced from said movable platform to accommodate said test specimen therebetween, said second platform including eccentrically disposed second mounting means aligned with said first mounting means and adapted for attachment of the opposite end of said test specimen; structure means rigidly interconnecting said base frame and said second platform whereby to fix said second platform in position relative to said base frame; a plurality of double acting, fluid actuated jacks operatively connected to said movable platform at spaced locations around said coupling means; a coupling for individually mounting each of said jacks to said base frame and including a universal joint whereby to permit said jacks to swivel freely; and fluid circuit means connected to said jacks for controlling the operation thereof, including conduit means connecting said jack in series, parallel and series-parallel circuits, a plurality of two-position valves operable to select a given circuit connection of said jacks and at least one reversible, multiple-position valve operable to cycle the flow of fluid through the selected circuit so as to induce a selected pattern of motion between said first and said second mounting means.

References Cited by the Examiner

UNITED STATES PATENTS 2,489,904  11/1949  Kratzer _____ 73—103 X

RICHARD C. QUEISSER, *Primary Examiner.*

G. M. GRON, J. W. MYRACLE, *Assistant Examiners.*